US012774376B2

(12) United States Patent
Kawada et al.

(10) Patent No.: US 12,774,376 B2
(45) Date of Patent: Oct. 27, 2026

(54) METHOD OF RETURNING CROSSLINKING SITE OF CROSSLINKED ELASTOMER TO NON-CROSSLINKED STATE

(71) Applicant: BRIDGESTONE CORPORATION, Tokyo (JP)

(72) Inventors: Midori Kawada, Tokyo (JP); Yasuo Horikawa, Tokyo (JP); Mari Miyano, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 451 days.

(21) Appl. No.: 18/578,595

(22) PCT Filed: Jun. 30, 2022

(86) PCT No.: PCT/JP2022/026428
§ 371 (c)(1),
(2) Date: Jan. 11, 2024

(87) PCT Pub. No.: WO2023/013334
PCT Pub. Date: Feb. 9, 2023

(65) Prior Publication Data

US 2024/0301096 A1 Sep. 12, 2024

(30) Foreign Application Priority Data

Aug. 5, 2021 (JP) ................................ 2021-129377

(51) Int. Cl.
*C08C 19/08* (2006.01)
*C08J 3/00* (2006.01)
*C08J 11/10* (2006.01)

(52) U.S. Cl.
CPC ................ *C08C 19/08* (2013.01); *C08J 3/00* (2013.01); *C08J 11/10* (2013.01)

(58) Field of Classification Search
CPC ... C08J 11/10; C08J 11/16; C08J 11/18; C08J 11/24; C08C 19/00; C08C 19/08; C08C 19/085; C08K 5/0091
See application file for complete search history.

(56) References Cited

U.S. PATENT DOCUMENTS

| | | | |
|---|---|---|---|
| 10,329,414 | B2 | 6/2019 | Leibler et al. |
| 11,505,676 | B2 | 11/2022 | Chen et al. |
| 11,680,074 | B2 | 6/2023 | Leibler et al. |
| 2017/0051117 | A1 | 2/2017 | Leibler et al. |
| 2017/0051144 | A1 | 2/2017 | Leibler et al. |
| 2018/0265691 | A1 | 9/2018 | Leibler et al. |

FOREIGN PATENT DOCUMENTS

| | | | |
|---|---|---|---|
| CN | 108341958 | A | 7/2018 |
| CN | 108368206 | A | 8/2018 |
| CN | 110724264 | A | 1/2020 |
| CN | 112812331 | A | 5/2021 |
| JP | 55-29520 | A | 3/1980 |
| JP | 2011-153272 | A | 8/2011 |
| JP | 2018-525498 | A | 9/2018 |
| JP | 2019-519538 | A | 7/2019 |
| JP | 2020-528956 | A | 10/2020 |
| WO | 2017/029413 | A1 | 2/2017 |

OTHER PUBLICATIONS

International Preliminary Report on Patentability (with translation of Written Opinion) dated Feb. 6, 2024 in International Application No. PCT/JP2022/026428.
Breuillac et al., "Polybutadiene Vitrimers Based on Dioxaborolane Chemistry and Dual Networks with Static and Dynamic Cross-links", Macromolecules, vol. 52, Sep. 12, 2019, pp. 7102-7113.
Liu et al., "Self-healing and reprocessing of transparent UV-cured polysiloxane elastomer", Progress in Organic Coatings, vol. 159, No. 106450, 2021, pp. 1-11.
Extended European Search Report issued Jun. 23, 2025 in Application No. 22852760.2.
International Search Report for PCT/JP2022/026428 dated Aug. 30, 2022.
Yi Chen et al., "Mechanically Robust, Self-Healable, and Reprocessable Elastomers Enabled by Dynamic Dual Cross-Links", Macromolecules, 2019, vol. 52, pp. 3805-3812 (8 pages).
Search Report dated Aug. 15, 2026, issued in Chinese Application No. 202280050118.8.

*Primary Examiner* — Kregg T Brooks
(74) *Attorney, Agent, or Firm* — Sughrue Mion, PLLC

(57) ABSTRACT

Provided is a method by which a crosslinking site of a crosslinked elastomer can easily be returned to a non-crosslinked state. The method of returning a crosslinking site of a crosslinked elastomer to a non-crosslinked state includes a step of causing contact of a crosslinked elastomer including a diboronic acid ester skeleton unit represented by a specific general formula (1) at a crosslinking site with a monoboronic acid compound represented by a specific general formula (3) in the presence of an organic solvent having an SP value (solubility parameter) of not less than 7 $(cal/cm^3)^{1/2}$ and not more than 10 $(cal/cm^3)^{1/2}$. In this step, a molar abundance ratio of the monoboronic acid compound relative to the diboronic acid ester skeleton unit (monoboronic acid compound/diboronic acid ester skeleton unit) is set as more than 2 and not more than 5.

4 Claims, No Drawings

METHOD OF RETURNING CROSSLINKING SITE OF CROSSLINKED ELASTOMER TO NON-CROSSLINKED STATE

This Application is a National Stage of International Application No. PCT/JP2022/026428 filed Jun. 30, 2022, claiming priority based on Japanese Patent Application No. 2021-129377 filed Aug. 5, 2021.

TECHNICAL FIELD

The present disclosure relates to a method of returning a crosslinking site of a crosslinked elastomer to a non-crosslinked state.

BACKGROUND

Recycling of vulcanized rubber (crosslinked rubber) in tires, etc. after use has been promoted in recent times in consideration of environmental issues and resource conservation. Although the devulcanization of vulcanized rubber is commonly known as a recycling technique for vulcanized rubber, this technique has a drawback of poor energy efficiency due to the extremely high temperature required in a devulcanization reaction.

Therefore, techniques for causing decomposition of vulcanized rubber by methods other than devulcanization are being studied. For example, Patent Literature (PTL) 1 discloses a decomposition and recovery method for vulcanized rubber in which vulcanized rubber is caused to decompose through a lipid peroxidation reaction, and then lipid is removed in alcohol having an alkali added thereto so as to recover rubber content. PTL 1 discloses that this method has a low decomposition reaction temperature, excellent energy efficiency, and a fast decomposition rate and yields a decomposition product that is easy to recycle and recover.

CITATION LIST

Patent Literature

PTL 1: JP2011-153272A

SUMMARY

Technical Problem

However, the technique described in PTL 1 broadly takes vulcanized rubbers as decomposition subjects without giving any consideration to rubbers (crosslinked elastomers) crosslinked by methods other than vulcanization (sulfur crosslinking).

Moreover, from viewpoints of versatility and more effective utilization of materials, it would be extremely useful to focus on crosslinked elastomers themselves so as to develop a crosslinked elastomer that can easily be decrosslinked and that can also be recrosslinked (i.e., a crosslinked elastomer having "reversible crosslinkability").

Accordingly, the present disclosure addresses a problem of providing a method by which a crosslinking site of a crosslinked elastomer can easily be returned to a non-crosslinked state.

Solution to Problem

As a result of diligent studies conducted with the aim of resolving the problem set forth above, the inventors discovered that in the case of a crosslinked elastomer including a specific skeleton unit at a crosslinking site, it is easy to return the crosslinking site to a non-crosslinked state under specific conditions, thereby leading to completion of the present disclosure. Specifically, primary features of the present disclosure for resolving the problem set forth above are as follows.

A method according to the present disclosure is a method of returning a crosslinking site of a crosslinked elastomer to a non-crosslinked state, comprising a step of causing contact of a crosslinked elastomer including, at a crosslinking site, a diboronic acid ester skeleton unit represented by general formula (1), shown below.

[Chem. 1]

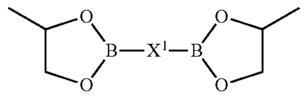

(1)

where, in general formula (1), $X^1$ is a single bond or any divalent group, with a monoboronic acid compound represented by general formula (3), shown below,

[Chem. 2]

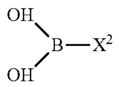

(3)

where, in general formula (3), $X^2$ is hydrogen or any monovalent group, in the presence of an organic solvent having an SP value (solubility parameter) of not less than 7 $(cal/cm^3)^{1/2}$ and not more than 10 $(cal/cm^3)^{1/2}$, wherein a molar abundance ratio of the monoboronic acid compound relative to the diboronic acid ester skeleton unit, in terms of monoboronic acid compound/diboronic acid ester skeleton unit, is set as more than 2 and not more than 5 in the step.

Advantageous Effect

According to the present disclosure, it is possible to provide a method by which a crosslinking site of a crosslinked elastomer can easily be returned to a non-crosslinked state.

DETAILED DESCRIPTION

The following describes embodiments of the present disclosure. However, the following description is intended for illustrative purposes only and is not intended to limit the scope of the present disclosure in any way.

(Method of Returning Crosslinking Site of Crosslinked Elastomer to Non-Crosslinked State)

A method of returning a crosslinking site of a crosslinked elastomer to a non-crosslinked state according to one embodiment of the present disclosure (hereinafter, also referred to as "the method of the present embodiment") is a method of returning, to a non-crosslinked state, a crosslinking site of a crosslinked elastomer including a diboronic acid ester skeleton unit represented by general formula (1), shown below,

[Chem. 3]

(1)

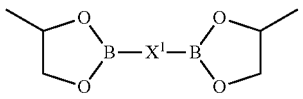

where, in general formula (1), $X^1$ is a single bond or any divalent group, at the crosslinked site and includes a step of causing contact of the crosslinked elastomer with a monoboronic acid compound represented by general formula (3), shown below,

[Chem. 4]

(3)

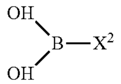

where, in general formula (3), $X^2$ is hydrogen or any monovalent group, in the presence of an organic solvent having an SP value (solubility parameter) of not less than 7 $(cal/cm^3)^{1/2}$ and not more than 10 $(cal/cm^3)^{1/2}$, wherein a molar abundance ratio of the monoboronic acid compound relative to the diboronic acid ester skeleton unit (monoboronic acid compound/diboronic acid ester skeleton unit) is set as more than 2 and not more than 5 in the step.

Crosslinking via the diboronic acid ester skeleton unit in the crosslinked elastomer described above is not bonding through sulfur as in typical vulcanized rubber. Moreover, by causing contact of the crosslinked elastomer described above with a monoboronic acid compound in the presence of a specific organic solvent, an exchange reaction occurs at the crosslinking site of the crosslinked elastomer, thereby resulting in crosslinking via the diboronic acid ester skeleton unit being replaced by bonding of the monoboronic acid compound. Since the monoboronic acid compound only includes one boronic acid that functions as a bonding site with the elastomer, linking of the elastomer is undone. Accordingly, the method of the present embodiment makes it easy to return the crosslinking site of the crosslinked elastomer to a non-crosslinked state (i.e., to cause decrosslinking).

Furthermore, since an elastomer that has been treated by the method of the present embodiment (i.e., a decrosslinked elastomer) can be further recrosslinked, versatile use of the elastomer for various rubber articles can be expected.

<Crosslinked Elastomer>

The crosslinked elastomer that is used in the method of the present embodiment includes a diboronic acid ester skeleton unit represented by the following general formula (1) at a crosslinking site.

[Chem. 5]

(1)

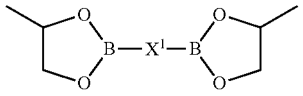

(In general formula (1), $X^1$ is a single bond or any divalent group.) This diboronic acid ester skeleton unit is typically derived from a structure of a crosslinking agent that is used in production of the crosslinked elastomer.

The divalent group that can constitute $X^1$ in general formula (1) may be a hydrocarbon group, for example, specific examples of which include linear and branched aliphatic groups (alkylene groups, alkenylene groups, and alkynylene groups) having a carbon number of 1 to 10; and aromatic-containing groups having a carbon number of 6 to 20 (1,2-phenylene group, 1,3-phenylene group, 1,4-phenylene group, 1,4-naphthylene group, 1,5-naphthylene group, 2,6-naphthylene group, 4,4'-biphenylene group, etc.). Moreover, —O—, —S—, —O—C(═O)—, —C(═O)—O—, —O—C(═O)—O—, $—NR^2—C(═O)—$, $—C(═O)—NR^2—$, $—NR^2—$, or —C(═O)— may be interposed in the aforementioned aliphatic groups and aromatic-containing groups. Note that $R^2$ represents a hydrogen atom or an alkyl group having a carbon number of 1 to 6.

The proportion constituted by the diboronic acid ester skeleton unit described above in the crosslinked elastomer that is used in the method of the present embodiment is preferably 17 mass % or less. In this case, adequate elastomer properties of the crosslinked elastomer can be retained. From the same viewpoint, the proportion constituted by the diboronic acid ester skeleton unit in the crosslinked elastomer is more preferably 14 mass % or less, and even more preferably 10 mass % or less. On the other hand, although no specific limitations are placed on the lower limit for the proportion constituted by the diboronic acid ester skeleton unit in the crosslinked elastomer so long as this proportion is more than 0 mass %, the proportion is preferably 1 mass % or more, and more preferably 2 mass % or more from a viewpoint of increasing strength to a similar degree as with sulfur crosslinking.

Note that the proportion constituted by the diboronic acid ester skeleton unit in the crosslinked elastomer can be calculated based on the amounts of an elastomer and a diboronic acid ester compound that are used in production of the crosslinked elastomer.

The crosslinked elastomer that is used in the method of the present embodiment is preferably obtained through crosslinking of a diene elastomer. In other words, the crosslinked elastomer of the present embodiment is preferably a crosslinked product of a diene elastomer. The diene elastomer is an elastomer that includes at least diene units and may be natural rubber (NR), butadiene rubber (BR), styrene-butadiene rubber (SBR), isoprene rubber (IR), chloroprene rubber (CR), or the like, for example. The diene elastomer may be one type of diene elastomer used individually or may be two or more types of diene elastomers used in combination. Of these examples, butadiene rubber (BR) and styrene-butadiene rubber (SBR) are preferable as the diene elastomer from a viewpoint of sufficiently ensuring mechanical strength of a rubber article such as a tire.

Moreover, the diene elastomer preferably has a vinyl bond content of 30 mass % or less and a weight-average molecular weight (Mw) of 1,000 or more. In other words, the crosslinked elastomer that is used in the method of the present embodiment is preferably obtained through crosslinking of a diene elastomer having a vinyl bond content of 30 mass % or less and a weight-average molecular weight of 1,000 or more. When the vinyl bond content of the diene elastomer is 30 mass % or less, the occurrence of gelation during heating and forming of the crosslinked elastomer can be effectively suppressed. Moreover, when the weight-average molecular weight (Mw) of the diene elastomer is 1,000 or more, sufficient entanglement arises in the crosslinked elastomer, and adequate mechanical strength can be displayed upon use in a rubber article such as a tire. From the same viewpoint, the vinyl bond content of the diene elastomer is preferably 28 mass % or less, and more preferably 26 mass % or less. On the other hand, the lower limit for the vinyl bond content of the diene elastomer is preferably 3 mass % or more, more preferably 5 mass % or more, even more preferably 8 mass % or more, and particularly preferably 10 mass % or more.

Note that the vinyl bond content of the diene elastomer referred to in the present specification is the mass proportion of units that are diene units and that are vinyl bonded among the overall diene elastomer. In other words, the vinyl bond content of the diene elastomer is not the proportion constituted by vinyl bonded units among diene units.

Also note that the weight-average molecular weight (Mw) can be determined by gel permeation chromatography (GPC) with polystyrene as a standard substance.

In a case in which the crosslinked elastomer is obtained through crosslinking of a diene elastomer, the diboronic acid ester skeleton unit in the crosslinked elastomer is preferably bonded to a carbon that is a constituent of a vinyl group remaining in a vinyl bonded diene unit in the diene elastomer. Moreover, bonding of the diboronic acid ester skeleton unit and the diene elastomer described above may be direct bonding or may be bonding via any group (for example, an alkylene group having a carbon number of 1 to 3).

A filler such as carbon black may be dispersed in the crosslinked elastomer that is used in the method of the present embodiment as a result of being compounded during production of the crosslinked elastomer. In a case in which a filler is dispersed in the crosslinked elastomer, the amount of this filler relative to 100 parts by mass of the crosslinked elastomer can be set as 10 parts by mass or more, and can be set as 100 parts by mass or less.

The crosslinked elastomer that is used in the method of the present embodiment can be produced by, for example, crosslinking the diene elastomer in the presence of a radical initiator using a diboronic acid ester compound represented by the following general formula (2).

[Chem. 6]

(2)

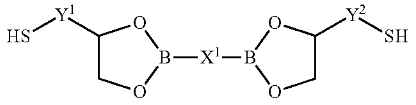

(In general formula (2), $X^1$ is a single bond or any divalent group, and $Y^1$ and $Y^2$ are each independently a single bond or a divalent hydrocarbon group.) According to this production method, a radical reaction is used to form crosslinks among the diene elastomer via a specific skeleton, thereby enabling easy production of the above-described crosslinked elastomer. Note that $X^1$ in general formula (2) corresponds to $X^1$ in general formula (1).

In the production method described above, the crosslinked elastomer can be obtained, more specifically, by compounding the radical initiator and the diboronic acid ester compound with the previously described diene elastomer, performing mixing thereof using a mixer or the like, and then heating the mixture. The heating temperature and time are preferably adjusted as appropriate in consideration of the vinyl bond content of the used diene elastomer, the type of used radical initiator, the amounts thereof that are used, and so forth.

Moreover, in addition to the diene elastomer, the radical initiator, and the diboronic acid ester compound, appropriate amounts of other components may be further compounded in the production method described above. Examples of other components include fillers such as carbon black.

<Organic Solvent>

The organic solvent that is used in the method of the present embodiment is required to have an SP value (solubility parameter) of not less than 7 $(cal/cm^3)^{1/2}$ and not more than 10 $(cal/cm^3)^{1/2}$. In a situation in which the SP value of the organic solvent deviates from the range set forth above, compatibility with the crosslinked elastomer decreases, and the exchange reaction with the monoboronic acid compound at the crosslinking site may not sufficiently occur. The SP value of the organic solvent is preferably 8 $(cal/cm^3)^{1/2}$ or more, and is preferably 9.5 $(cal/cm^3)^{1/2}$ or less from a viewpoint of more reliably instigating the exchange reaction.

Note that the SP value can be calculated in accordance with the Hansen method. Also note that the organic solvent may be a single solvent or may be a mixed solvent.

<Monoboronic Acid Compound>

The monoboronic acid compound that is used in the method of the present embodiment is represented by the following general formula (3).

[Chem. 7]

(3)

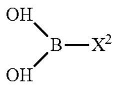

(In general formula (3), $X^2$ is hydrogen or any monovalent group.) In other words, the monoboronic acid compound includes one boronic acid. The monovalent group that can constitute $X^2$ in general formula (3) may be a hydrocarbon group, for example, specific examples of which include linear and branched aliphatic groups (alkyl groups, alkenyl groups, and alkynyl groups) having a carbon number of 1 to 10; aromatic-containing groups having a carbon number of 6 to 20 (phenyl group, naphthyl group, biphenyl group, etc.); and heteroaromatic groups (2-furyl group, etc.). Moreover, —O—, —S—, —O—C(═O)—, —C(═O)—O—, —O—C(═O)—O—, $—NR^2—C(═O)—$, $—C(═O)—NR^2—$, $—NR^2—$, or —C(═O)— may be interposed in the aforementioned aliphatic groups and aromatic-containing groups. Note that $R^2$ represents a hydrogen atom or an alkyl group having a carbon number of 1 to 6.

The monovalent group that can constitute $X^2$ in general formula (3) is preferably equivalent to a group having hydrogen bonded at one of the bonding sites of the divalent group that can constitute $X^1$ in the previously described general formula (1). As one example, in a case in which a crosslinked elastomer for which $X^1$ in general formula (1) is a phenylene group is used, it is preferable to use a monoboronic acid compound for which $X^2$ in general formula (3) is a phenyl group. In this case, the exchange reaction can more effectively be instigated.

<Monoboronic Acid Contacting Step>

In the monoboronic acid contacting step, the crosslinked elastomer is brought into contact with the monoboronic acid compound in the presence of the specific organic solvent described above. This contacting causes an exchange reaction to occur at the crosslinking site of the elastomer. During the above, two elastomer crosslinking sites that are linked typically each become capped by a functional group represented by the following general formula (4):

[Chem. 8]

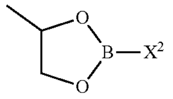

(4)

and thus return to a non-crosslinked state. Simultaneously thereto, a diboronic acid compound represented by the following general formula (9):

[Chem. 9]

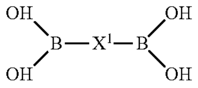

(9)

which is derived from the diboronic acid ester skeleton unit at the crosslinking site, is typically produced.

Note that in the monoboronic acid contacting step, the ratio in which the diboronic acid ester skeleton unit included in the crosslinked elastomer and the monoboronic acid compound are present is crucial. Specifically, a molar abundance ratio of the monoboronic acid compound relative to the diboronic acid ester skeleton unit (monoboronic acid compound/diboronic acid ester skeleton unit) is required to be more than 2 and not more than 5. In a situation in which this molar abundance ratio is 2 or less, the number of chemical equivalents of boronic acid may be insufficient for undoing links among the elastomer. Moreover, in a situation in which this molar abundance ratio is more than 5, this increases the residual amount of the monoboronic acid compound, which then acts as an impediment in a situation in which further recrosslinking is performed after decrosslinking.

A preferred range for the molar abundance ratio of the monoboronic acid compound relative to the diboronic acid ester skeleton unit (monoboronic acid compound/diboronic acid ester skeleton unit) differs depending on whether or not a filler such as carbon black is dispersed in the crosslinked elastomer. In a case in which a filler is not dispersed in the crosslinked elastomer, this molar abundance ratio is preferably 4 or more. Moreover, in a case in which a filler is dispersed in the crosslinked elastomer, this molar abundance ratio is preferably 2.5 or more. In these cases, it is possible to cause more sufficient and effective decrosslinking.

In the monoboronic acid contacting step, the concentration of the crosslinked elastomer (mass proportion of crosslinked elastomer among total of crosslinked elastomer and organic solvent) is preferably not less than 5 mass % and not more than 65 mass %. When the concentration of the crosslinked elastomer is within the range set forth above, it is possible to cause more sufficient and effective decrosslinking. From the same viewpoint, the concentration of the crosslinked elastomer is more preferably 10 mass % or more. Particularly in a case in which a filler is dispersed in the crosslinked elastomer, the concentration of the crosslinked elastomer is preferably 20 mass % or more.

Note that a lower concentration of the crosslinked elastomer results in the crosslinked elastomer being in an immersed state in the organic solvent, whereas a higher concentration of the crosslinked elastomer results in the crosslinked elastomer being in a swollen state with the organic solvent.

No specific limitations are placed on specific conditions (temperature, time, etc.) in the monoboronic acid contacting step. However, it is preferable that the crosslinked elastomer is finely milled in advance in order to increase the frequency of contact with the monoboronic acid compound. Moreover, solid-liquid separation treatment may be performed by a known method after the monoboronic acid contacting step.

EXAMPLES

The following describes the present disclosure in more detail through Examples. However, these Examples are for illustrative purposes and are not intended to limit the scope of the present disclosure in any way.

Note that the following provides not only examples of the method of returning a crosslinking site of a crosslinked elastomer to a non-crosslinked state (i.e., decrosslinking) according to the present disclosure, but also of producing the crosslinked elastomer and recrosslinking after decrosslinking as a single series.

(Production of Crosslinked Elastomer)

Elastomer compositions were produced according to formulations shown in Table 1. Next, each elastomer composition was heated under conditions shown in Table 1 and the storage modulus G' thereof was measured using a rubber process analyzer (produced by Alpha Technologies). The results are shown in Table 1. In each of the examples, the storage modulus G' was of roughly the desired value. Therefore, crosslinking was judged to have occurred.

Note that Reference Example 1 is an example of sulfur crosslinking (vulcanization) in which carbon black is not used as a filler, whereas Examples 1-1 to 1-4 are examples in which conditions are appropriately adjusted so as to obtain a storage modulus G' close to that in Reference Example 1 without using carbon black. Likewise, Reference Example 2 is an example of sulfur crosslinking (vulcanization) in which carbon black is used as a filler, whereas Example 1-5 is an example in which conditions are appropriately adjusted so as to obtain a storage modulus G' close to that in Reference Example 2 using carbon black.

TABLE 1

| | | Reference Example 1 | Example 1-1 | Example 1-2 | Example 1-3 | Example 1-4 | Reference Example 2 | Example 1-5 |
|---|---|---|---|---|---|---|---|---|
| Diene elastomer *1 | Parts by mass | 100 | 100 | 100 | 100 | 100 | 100 | 100 |
| BDB *2 | | 0 | 3 | 5 | 10 | 5 | 0 | 5 |
| CB *3 | | 0 | 0 | 0 | 0 | 0 | 50 | 50 |
| Radical initiator *4 | | 0 | 0.1 | 0.1 | 0.1 | 0.3 | 0 | 0.5 |
| Vulcanization accelerator DPG *5 | | 0.6 | 0 | 0 | 0 | 0 | 0.6 | 0 |
| Vulcanization accelerator MBTS *6 | | 0.6 | 0 | 0 | 0 | 0 | 0.6 | 0 |
| Vulcanization accelerator TBBS *7 | | 0.6 | 0 | 0 | 0 | 0 | 0.6 | 0 |

TABLE 1-continued

| | | Reference Example 1 | Example 1-1 | Example 1-2 | Example 1-3 | Example 1-4 | Reference Example 2 | Example 1-5 |
|---|---|---|---|---|---|---|---|---|
| Sulfur | | 1 | 0 | 0 | 0 | 0 | 1 | 0 |
| Proportion of BDB skeleton unit | Mass % | 0 | 2.9 | 4.8 | 9.1 | 4.8 | 0.0 | 4.8 |
| Heating temperature | ° C. | 160 | 160 | 160 | 160 | 120 | 160 | 120 |
| Heating time | min | 20 | 180 | 180 | 180 | 20 | 20 | 60 |
| Storage modulus G' of crosslinked elastomer | kPa | 570 | 300 | 350 | 410 | 420 | 800 | 800 |

*1 Diene elastomer: TUFDENE® 2000R (TUFDENE is a registered trademark in Japan, other countries, or both) produced by Asahi Kasei Corporation, styrene-butadiene rubber, vinyl bond content 10 mass % to 26 mass %, weight-average molecular weight 373,000 (to 3 significant figures)

*2 BDB: Diboronic acid ester compound represented by following formula (5) (synthetic product)

[Chem. 10]

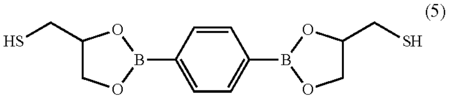 [SMILES: SCC1COB(c2ccc(B3OCC(CS)O3)cc2)O1]
(5)

*3 CB: HAF grade carbon black

*4 Radical initiator: Azobisisobutyronitrile (AIBN)

*5 Vulcanization accelerator DPG: 1,3-Diphenylguanidine

*6 Vulcanization accelerator MBTS: Di-2-benzothiazolyl disulfide

*7 Vulcanization accelerator TBBS: N-(tert-Butyl)-2-benzothiazolesulfenamide

Note that crosslinked elastomers obtained in Examples 1-1 to 1-5 were confirmed to include a diboronic acid ester skeleton unit represented by the following formula (6):

[Chem. 11]

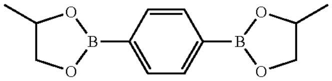
(6)

through appropriate use of solvent NMR. Moreover, in these crosslinked elastomers, a crosslink was formed through direct bonding of the above-described diboronic acid ester skeleton unit to a carbon that was a constituent of a vinyl group remaining in a vinyl bonded butadiene unit in the diene elastomer.

(Decrosslinking Treatment of Crosslinked Elastomer)

The crosslinked elastomer obtained in Example 1-4 was selected as a crosslinked elastomer in which carbon black was not mixed and the crosslinked elastomer obtained in Example 1-5 was selected as a crosslinked elastomer in which carbon black was mixed.

Each of these crosslinked elastomers was finely milled and was then loaded into tetrahydrofuran (THF; SP value: 8.95 $(cal/cm^3)^{1/2}$) as an organic solvent. Phenylboronic acid ($PhB(OH)_2$) was further added as a monoboronic acid compound (BA), was thoroughly mixed therewith, and then the mixture was left to settle at room temperature (approximately 25° C.) for 1 day. In the above, the concentration of the crosslinked elastomer (mass proportion of crosslinked elastomer among total of crosslinked elastomer and organic solvent) and the molar abundance ratio of the monoboronic acid compound relative to the diboronic acid ester skeleton unit in the crosslinked elastomer (BA/BDB skeleton unit) were set as shown in Table 2. After settling, casting was performed and solvent was evaporated to yield a treated elastomer.

<Evaluation of Decrosslinking>

The treated elastomer that was obtained was used to perform a roll forming operation. A case in which roll forming could be performed was evaluated as a case in which softness had been imparted as a result of decrosslinking (crosslinking sites returning to a non-crosslinked state). The results are shown in Table 2.

TABLE 2

| | Example 2-1 | Example 2-2 | Example 2-3 | Example 2-4 | Example 2-5 | Example 2-6 | Example 2-7 |
|---|---|---|---|---|---|---|---|
| Crosslinked elastomer (Example No.) | | 1-4 (CB not used) | | | 1-5 (CB used) | | |
| Crosslinked elastomer concentration (mass %) | 10 | 10 | 10 | 13 | 50 | 50 | 50 |
| BA/BDB skeleton unit (molar abundance ratio) | 3 | 3.5 | 4 | 2.5 | 2.5 | 3 | 3.5 |
| Evaluation of roll formability (decrosslinking) | ○ | ○ | ○ | ○ | ○ | ○ | ○ |
| Remarks relating to formed article of treated elastomer | Shrinkage | Shrinkage | Similar to initial | Fairly rough surface | Similar to initial | Similar to initial | Similar to initial |

*Similar to initial: Similar quality to diene elastomer before crosslinking

It can be seen from Table 2 that an evaluation result of “O” was given for decrosslinking in all of Examples 2-1 to 2-7. In other words, the crosslinked elastomers obtained in Examples 1-4 and 1-5 could easily be decrosslinked by causing contact of the crosslinked elastomer with a monoboronic acid compound in the presence of a specific organic solvent.

Also note that for the treated elastomers (decrosslinked elastomers) obtained in Examples 2-1 to 2-7, it was confirmed through appropriate use of solution NMR that a site where the skeleton represented by formula (6) was bonded in the crosslinked elastomer prior to treatment had been capped by a functional group represented by the following formula (7):

[Chem. 12]

(7)

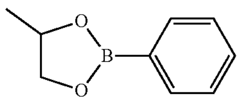

and thus crosslinking had been undone (crosslinking sites had returned to a non-crosslinked state). At the same time, it was confirmed through appropriate use of solution NMR that a diboronic acid compound ((1,4-phenylene)diboronic acid) represented by the following formula (8):

[Chem. 13]

(8)

which is derived from the aforementioned skeleton, had been produced.

The crosslinked elastomers obtained in Examples 1-1 to 1-3 also include the diboronic acid ester skeleton unit described above. Therefore, these crosslinked elastomers are thought to be easy to decrosslink through the same treatment as described above.

(Recrosslinking of Decrosslinked Elastomer)

The decrosslinked elastomer (treated elastomer) obtained in Example 2-2 or Example 2-3 was selected as a decrosslinked elastomer in which carbon black was not mixed and the decrosslinked elastomer (treated elastomer) obtained in Example 2-5 was selected as a decrosslinked elastomer in which carbon black was mixed.

Each of these decrosslinked elastomers was loaded into a solvent shown in Table 3 together with the diboronic acid compound produced during decrosslinking treatment. A radical initiator was further added according to a formulation shown in Table 3, and these were left to settle over night at room temperature (approximately 25° C.). In the above, the concentration of the decrosslinked elastomer (mass proportion of decrosslinked elastomer among total of decrosslinked elastomer and solvent) was set as shown in Table 3. After settling, casting was performed and solvent was evaporated to yield a treated elastomer.

<Evaluation of Crosslinking (Recrosslinking)>

The obtained treated elastomer was heated at 120° C. for 10 minutes to 30 minutes (until the value of the storage modulus G' stabilized) and the storage modulus G' thereof was measured using a rubber process analyzer (produced by Alpha Technologies). In each of the examples, the measured storage modulus G' was at least 20% compared to the storage modulus G' of the crosslinked elastomer prior to addition of the monoboronic acid compound described above. Therefore, crosslinking was judged to have occurred in each of the examples. More specifically, crosslinking was judged to have occurred to a more sufficient degree and an evaluation of “O” was given in a case in which the measured storage modulus G' was 50% or more compared to the storage modulus G' of the crosslinked elastomer prior to addition of phenylboronic acid described above, whereas an evaluation of “A” was given in a case in which the measured storage modulus G' was less than 50% compared thereto. The results are shown in Table 3.

TABLE 3

| | | Example 3-1 | Example 3-2 | Example 3-3 | Example 3-4 | Example 3-5 | Example 3-6 | Example 3-7 |
|---|---|---|---|---|---|---|---|---|
| Decrosslinked elastomer (Example No.) | | 2-2 (CB not used) | | 2-3 (CB not used) | | 2-5 (CB used) | | |
| Decrosslinked elastomer | Parts by mass | 100 | 100 | 100 | 100 | 100 | 100 | 100 |
| Radical initiator *4 | Parts by mass | 0.5 | 0.5 | 0.3 | 0.3 | 1 | 1 | 0.5 |
| Type of solvent | | iPrOH | MeOH:THF 1:1 | MeOH:THF 1:1 | MeOH:THF 2:1 | MeOH:THF 1:1 | MeOH:THF 2:1 | MeOH:THF 4:1 |
| SP value of solvent (mixed solvent) | $(cal/cm^3)^{1/2}$ | 10.41 | 10.43 | 10.43 | 11.36 | 10.43 | 11.36 | 12.38 |
| Decrosslinked elastomer concentration | Mass % | 10 | 10 | 10 | 10 | 50 | 50 | 50 |
| Evaluation of crosslinking (recrosslinking) | | Δ | ○ | ○ | ○ | Δ | ○ | ○ |

*iPrOH: Isopropanol (SP value: 10.41), MeOH: Methanol, THF: Tetrahydrofuran (SP value: 8.95)

It can be seen from Table 3 that the decrosslinked elastomers obtained in Examples 2-2, 2-3, and 2-5 could easily be crosslinked (recrosslinked) by causing contact of the decrosslinked elastomer with a diboronic acid compound in the presence of a specific solvent.

Note that the treated elastomers (recrosslinked elastomers) obtained in Examples 3-1 to 3-7 were confirmed to include a diboronic acid ester skeleton unit represented by the following formula (6):

[Chem. 14]

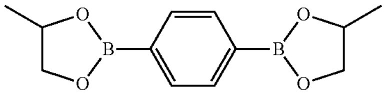

(6)

through appropriate use of solvent NMR. In other words, the treated elastomers (recrosslinked elastomers) obtained in Examples 3-1 to 3-7 had substantially the same structure as the crosslinked elastomers obtained in Examples 1-1 to 1-5.

INDUSTRIAL APPLICABILITY

According to the present disclosure, it is possible to provide a method by which a crosslinking site of a crosslinked elastomer can easily be returned to a non-crosslinked state.

The invention claimed is:

1. A method of returning a crosslinking site of a crosslinked elastomer to a non-crosslinked state, comprising a step of causing contact of a crosslinked elastomer including, at a crosslinking site, a diboronic acid ester skeleton unit represented by general formula (1), shown below,

[Chem. 1]

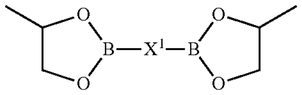

(1)

where, in general formula (1), $X^1$ is a single bond or any divalent group, with a monoboronic acid compound represented by general formula (3), shown below,

[Chem. 2]

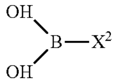

(3)

where, in general formula (3), $X^2$ is hydrogen or any monovalent group, in the presence of an organic solvent having an SP value (solubility parameter) of not less than 7 $(cal/cm^3)^{1/2}$ and not more than 10 $(cal/cm^3)^{1/2}$, wherein a molar abundance ratio of the monoboronic acid compound relative to the diboronic acid ester skeleton unit, in terms of monoboronic acid compound/diboronic acid ester skeleton unit, is set as more than 2 and not more than 5 in the step.

2. The method according to claim 1, wherein a proportion constituted by the diboronic acid ester skeleton unit in the crosslinked elastomer is 17 mass % or less.

3. The method according to claim 2, wherein the crosslinked elastomer is obtained through crosslinking of a diene elastomer having a vinyl bond content of 30 mass % or less and a weight-average molecular weight of 1,000 or more.

4. The method according to claim 1, wherein the crosslinked elastomer is obtained through crosslinking of a diene elastomer having a vinyl bond content of 30 mass % or less and a weight-average molecular weight of 1,000 or more.

* * * * *